A. J. CUMMER.
SPIRAL HARROW.
APPLICATION FILED JUNE 14, 1915.
1,191,404.
Patented July 18, 1916.
2 SHEETS—SHEET 1.
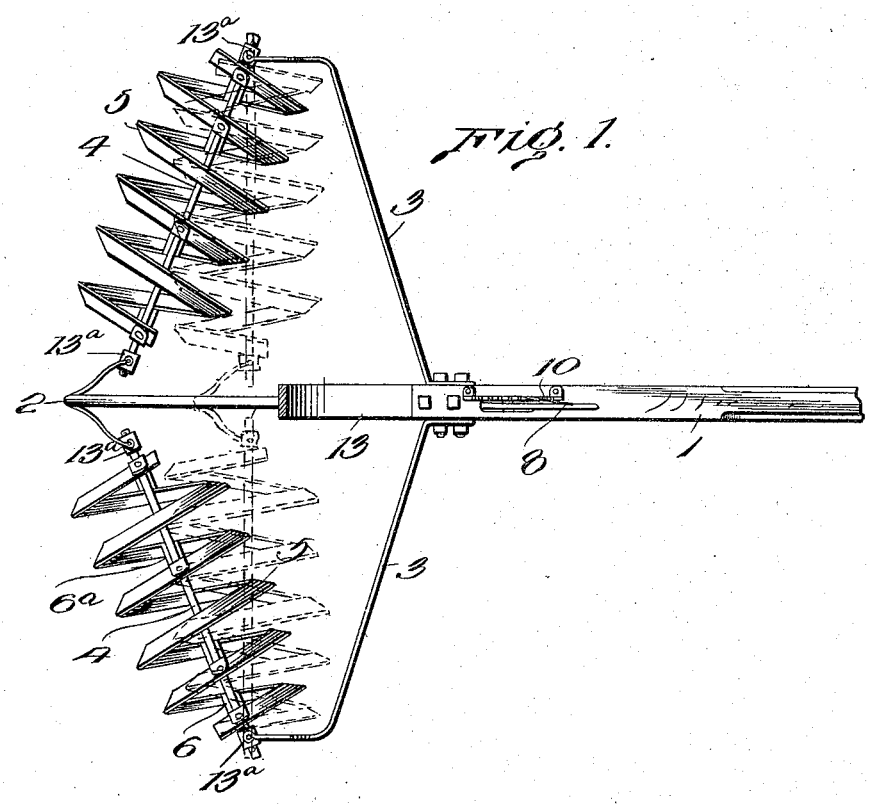
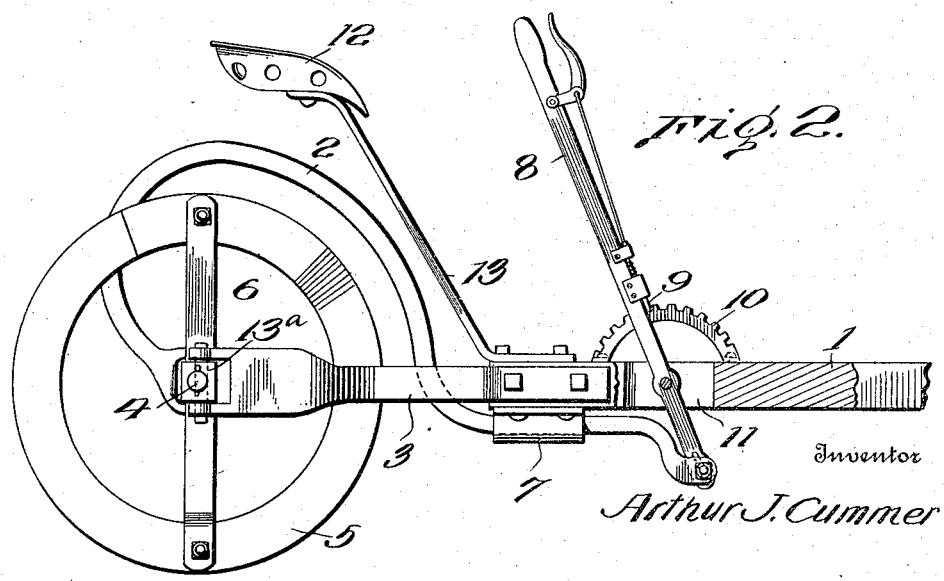
Inventor
Arthur J. Cummer
Attorneys

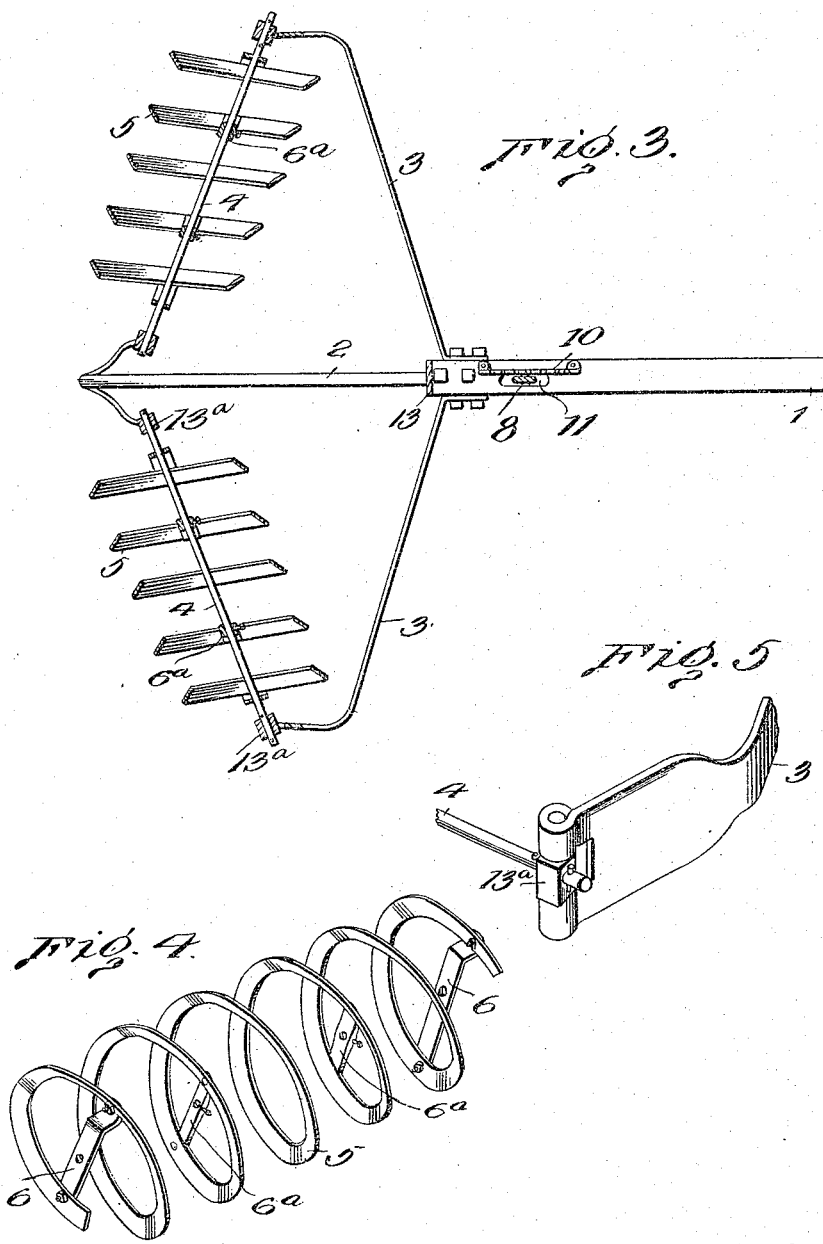

UNITED STATES PATENT OFFICE.

ARTHUR J. CUMMER, OF DUBUQUE, IOWA, ASSIGNOR OF ONE-THIRD TO CHARLES MATZ AND ONE-THIRD TO MICHAEL MATZ, BOTH OF DUBUQUE, IOWA.

SPIRAL HARROW.

1,191,404.      Specification of Letters Patent.      Patented July 18, 1916.

Application filed June 14, 1915. Serial No. 34,045.

*To all whom it may concern:*

Be it known that I, ARTHUR J. CUMMER, a citizen of the United States, residing at Dubuque, in the county of Dubuque and State of Iowa, have invented certain new and useful Improvements in Spiral Harrows, of which the following is a specification.

This invention has relation to agricultural implements and more particularly to the type for preparing the soil for broadcast or drill sowing of seed.

The invention is designed most especially to provide a harrow which in the present instance is of spiral or screw form, such harrow embodying similar members having an opposite arrangement whereby the lateral action of one is neutralized by the lateral action of the other, thereby causing the implement to run in a straight line without side draft.

The invention has for its object the provision of an implement of the character specified which will not tend to clog, which will scour and polish and insure proper depth of action, which obviates the use of scrapers and the expense and trouble incident thereto, which subserves the purpose of a chopper for cutting up corn stalks, weeds and other rubbish, which will insure a deep cut with a minimum amount of weight to force the blade into the soil, which will operate with a comparatively light draft, which insures a thorough pulverizing and leveling of the soil and a covering of trash and the like so as to rot and fertilize the soil and which operates diagonally, thereby obtaining the best possible results in the preparation of the soil for the reception of seed.

With these and other objects in view, which will readily appear as the nature of the invention is better understood, the same consists in the improved construction and novel arrangement and combination of parts which will be hereinafter fully described and particularly claimed.

In the accompanying drawings has been illustrated a simple and preferred form of the invention, it being, however, understood that no limitation is necessarily made to the precise structural details therein exhibited, but that changes, alterations and modifications within the scope of the invention as claimed may be resorted to when desired.

Referring to the drawings,—Figure 1 is a top plan view of a spiral harrow, embodying the invention, the upper portion of the seat support being broken away and the dotted lines indicating an adjusted position of the harrow members; Fig. 2 is a side view, a portion of the pole being in section; Fig. 3 is a horizontal section; Fig. 4 is a detail perspective view of one of the spiral members; Fig. 5 is a detail perspective view showing one manner of supporting the shaft of the spiral members.

Corresponding and like parts are referred to in the following description and indicated in all the views of the drawings by the same reference characters.

The frame of the implement may be of any design and construction according to the particular use for which the harrow is intended. As shown, the frame comprises a pole 1, a central member 2 and side members 3. The side members 3 are of similar formation and have their forward ends secured to opposite sides of the rear end of the pole 1 thence directed laterally in opposite directions and again rearwardly in parallel relation. The central member 2 is slidingly secured near its forward end to the rear end of the pole 1 and extends upwardly and rearwardly and then downwardly and laterally forward. The several members 2 and 3 may be formed of metal rods or bars of any nature. Shafts 4 are journaled at their ends in the rear ends of the members 2 and 3 and extend in opposite directions. The shafts may be journaled to the members 2 and 3 in any manner so as to turn freely. Similar harrow members 5 are mounted upon the shafts 4 and rotate therewith. Each of the harrow members 5 is constructed of ribbon or relatively narrow strip of metal wound upon itself into the form of a helix, coil or spiral. The convolutions are regularly spaced and form individual cutting elements or blades which act upon the soil to break up clods, level the surface and cut up stalks, weeds and rubbish. The harrow members are open, hence are not susceptible of becoming readily clogged and are, moreover, self-cleaning because of the open-structure and the spiral arrangement of the cutting elements or blades. Bars 6 are attached at a middle point to end portions of the shafts and have their outer ends secured to the terminal cutting elements or blades of the harrow members. The bars 6 constitute supporting means for the harrow members as well as attaching means for connecting such members to the shafts 4. The cutting elements or blades of the harrow members are preferably dished, that is one face is made convex and the opposite face concave. The concave faces of the cutting elements or blades are outwardly disposed whereas the convex faces extend inward. This arrangement has been found to give the best results combined with the opposite inclination of the harrow members. It is preferred to have the harrow members of uniform diameter throughout their length since such arrangement insures a like action of each cutting element or blade comprising the harrow members as a whole.

In the preferred form of harrow the central member 2 is adjustable forwardly and backwardly, thereby admitting of varying the inclination of the harrow members according to the nature of the work and the results to be attained. As shown by the dotted lines in Fig. 1 the harrow members may be moved so as to aline transversely in which position the cutting elements roll over the ground without cutting any furrows therein. By moving the central member 2 so as to change the opposite inclination of the harrow members the nature of their work may be varied to meet soil conditions. A mounting 7 is secured to the pole 1 and the forward portion of the member 2 is slidably mounted therein. An operating lever 8 is mounted upon the pole 1 and has its lower end connected with the forward end of the central member 2. The operating lever 8 is provided with a latch 9 of ordinary formation and arranged to coöperate with a toothed segment 10 to hold the operating lever and harrow members in the adjusted position. The pole 1 is formed with a longitudinal slot 11 through which the lever 8 passes.

A seat 12 is attached to the upper end of a standard 13 which is secured at its lower end to the pole 1. The seat is preferably arranged above the harrow members to admit of the weight of the driver being utilized for holding the harrow members to the work when the implement is in operation.

To admit of the various adjustments of the harrow members it is necessary to mount the same in adjustable bearings. These bearings are indicated at 13ª and have pivotal connection with the members 2 and 3 so as to adapt themselves to the direction of strain and thereby prevent any binding of the shafts in the bearings. Intermediate bars 6ª are attached to the shafts in any manner and are connected at their ends to intermediate convolutions of the spiral members. It is to be understood that while it is preferred to construct each of the spiral members of a single ribbon, skelp or strip, the same may comprise sections and the convolutions may be spaced apart a greater or less distance.

It is to be understood that an implement embodying the invention may be variously constructed for use either by hand or to be drawn or propelled over the field in any manner and in operation the tendency to side draft of one of the harrow members is neutralized by the opposite tendency to side draft of the other harrow member. The cutting elements or blades being narrow penetrate the soil with a minimum resistance; hence it is not necessary to weight the implement to force the cutting elements into the soil, the weight of the usual parts comprising the frame and harrow members being sufficient for the purpose. The arrangement of the harrow members and their peculiar spiral or screw formation result in the furrows extending diagonally of the field, thereby giving the best results in preparing the surface for planting. The disposition of the harrow members and their cutting elements insures a leveling of the surface and a breaking up of all clods in the operation of the implement.

Having thus described the invention, what is claimed as new is:—

An implement of the character described comprising a tongue, side members secured rigidly thereto and diverging outwardly and rearwardly therefrom, bearings pivoted in the rear ends of said side members to swing in horizontal planes, a central member supported from the tongue and disposed in rear thereof and spaced therefrom, bearings pivoted in said central member for movement in a horizontal plane, shafts each journaled at its inner end in a bearing in said central member and at its outer end in a bearing in a side member, supporting bars radiating from said shafts, an earth-treating device connected with each shaft by the said supporting bars, each of said earth-treating devices consisting of a single continuous spirally wound ribbon encircling and spaced from the shaft and having its ends secured to the supporting bars immediately adjacent the ends of the shaft, and means on the tongue for shifting the central member forwardly or rearwardly in the longitudinal plane of the tongue.

In testimony whereof I affix my signature.

ARTHUR J. CUMMER. [L. S.]